US007165722B2

(12) United States Patent
Shafer et al.

(10) Patent No.: US 7,165,722 B2
(45) Date of Patent: Jan. 23, 2007

(54) METHOD AND SYSTEM FOR COMMUNICATING WITH IDENTIFICATION TAGS

(75) Inventors: Steven Shafer, Seattle, WA (US); David Thaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/798,754

(22) Filed: Mar. 10, 2004

(65) Prior Publication Data

US 2005/0199716 A1    Sep. 15, 2005

(51) Int. Cl.
*G06F 17/60* (2006.01)
(52) U.S. Cl. .................................... 235/385
(58) Field of Classification Search ............... 235/385, 235/472.02, 487, 375; 700/215; 340/5.92
See application file for complete search history.

(56) References Cited

U.S. PATENT DOCUMENTS

| | | | |
|---|---|---|---|
| 5,280,159 A | 1/1994 | Schultz et al. | |
| 6,247,057 B1 | 6/2001 | Barrera | |
| 6,483,433 B2 | 11/2002 | Moskowitz | |
| 6,507,869 B1 | 1/2003 | Franke et al. | |
| 2002/0188506 A1 | 12/2002 | Smith | |
| 2003/0038172 A1 | 2/2003 | Bodin et al. | |
| 2003/0095032 A1* | 5/2003 | Hoshino et al. | 340/5.92 |
| 2003/0144926 A1 | 7/2003 | Bodin et al. | |
| 2003/0214928 A1* | 11/2003 | Chuah | 370/336 |
| 2003/0226887 A1 | 12/2003 | Komine et al. | |
| 2004/0024660 A1* | 2/2004 | Ganesh et al. | 705/28 |
| 2004/0145472 A1* | 7/2004 | Schmidtberg et al. | 340/539.27 |
| 2004/0264441 A1* | 12/2004 | Jalkanen et al. | 370/352 |
| 2005/0092825 A1* | 5/2005 | Cox et al. | 235/375 |
| 2005/0093698 A1* | 5/2005 | Sakamoto et al. | 340/572.1 |
| 2005/0108076 A1* | 5/2005 | Carrender et al. | 705/9 |

FOREIGN PATENT DOCUMENTS

WO     WO 02/27623 A    4/2002

OTHER PUBLICATIONS

European Patent Office, "European Search Report", for European Patent Application No. 05101811.7, Jan. 20, 2006.
Auto-ID, "Auto-ID Object Name Service (ONS) 1.0", Aug. 12, 2003, Auto-ID Center.
Hiranaka Y. et al., "Multimedia and Routing Specific Applications on IPv6 Networks", Proceedings of the 2004 International Symposium on Applications and the Internet Workshops (SAINTW'04), Jan. 26, 2004, pp. 123-126, Piscataway, USA.
Uo Y. et al., "White Paper: Internet and Auto-ID Architecture", Oct. 1, 2003, Auto-ID Center.
Ohta K. et al., "Adaptive Terminal Middleware for Session Mobility", Proceedings of IEEE Multimedia Signal Workshop in 2002, IEEE May 19, 2003, pp. 394-399, Piscataway, USA.

(Continued)

*Primary Examiner*—Thien M. Le
*Assistant Examiner*—Edwyn Labaze
(74) *Attorney, Agent, or Firm*—Microsoft Corporation

(57) ABSTRACT

A method, identification tag reader and computer program product for communication with an identification tag are disclosed. To communicate with the tag, identification data may be retrieved from an identification tag. A guest identification, compliant with at least a portion of a standard network protocol address, may be assigned to the identification tag. A message addressed to a tag routing address of the tag may be received, and a response to the message may be sent.

36 Claims, 13 Drawing Sheets

OTHER PUBLICATIONS

Engels et al., The Networked Physical World: An Automated Identification Architecture, Second IEEE Workshop on Internet Applications, Jul. 23-24, 2001, p. 76-77, San Jose CA.

Engels, David, A comparison of the Electronic Product Code Identification Scheme & the Internet Protocol Address Identification Scheme, Auto-ID Center MIT, Jun. 1, 2002, p. 1-7.

Fritsche, et al., "Mobile IPv6: Mobility Support for the Next Generation Internet," IABG, (http://www.ipv6forum.com/navbar/papers/MobileIPv6_Whitepaper.pdf), Aug. 2003.

Hilliard, et al, Electronic Product Codes, Odin Technologies Laboratory, Sep. 15, 2003, p. 1-8, Reston, VA.

Johnson, et al., "Mobility Support in IPv6," IETF draft request for comments; (http://www.ietf.org/internet-drafts/draft-ietf-mobileip-ipv6-24.txt), Jun. 2003.

Military's RFID Alternative: IPv6, RFID Journal, Oct. 13, 2003, http://216.121.131.129/article/articleprint/609/-1/1/.

Waldrop, et al., Colorwave: A MAC for RFID Reader Networks, IEEE Wireless Communications and Networking conference, 2003, p. 1701-1704.

\* cited by examiner

METHOD AND SYSTEM FOR COMMUNICATING WITH IDENTIFICATION TAGS

FIELD OF THE INVENTION

This application is directed to methods and systems of communication and asset management, and more particularly, to methods and systems of communication for communicating with assets using radio frequency identification ("RFID").

BACKGROUND OF THE INVENTION

Various methods of labels and tags have been used to identify assets, particularly to track items in transit or as they are being purchased by a consumer, including for example, Uniform Product Codes ("UPC"), Serialized Shipping Container Codes ("SSCC"), International Standard Book Numbers ("ISBN"), magnetic cards, integrated circuit ("IC") cards, and radio frequency identification ("RFID") tags. These tags, when read and translated, identify some property of the asset which may be used to track, collate, manage or convey the assets in the asset management system. The identification data may be stored in a private format, but to improve interoperability, the EPCglobal organization (Electronic Product Code organization) has developed a standard format for the RFID numbers.

As shown in FIG. 1, the electronic product codes ("EPC") 500 are typically 96 bits wide and include a version number 502, a manager number 504 that identifies the producer of the asset, an object class 506 that identifies the type of asset (such as a SKU), and a serial number 508 that distinguishes each individual tag. In addition to the 96-bit EPC, various other EPC formats have been proposed including a 256-bit EPC. The EPC is typically stored on a RFID tag 514 (shown in FIG. 2) including a microchip or IC with an attached antenna.

To resolve the EPC into product information, the reader 510 sends a radio frequency signal 512 querying any identification tags 514 in range, as shown in FIG. 2. An active identification ("ID") tag 514a has a battery to run the IC to broadcast a reply to the reader, and a passive tag 514b draws power from the sent signal 512 to reply. Either reply 518 to the reader will include the tag's EPC 500a, 500b. The reader then communicates with a Savant computer system 516, which is a form of distributed software specified by the Massachusetts Institute of Technology Auto-ID Center (now a part of EPCglobal). The reader may be physically connected to the Savant computer and/or may be a mobile reader which communicates with the Savant computer system either through a wireless connection, such as "Wi-Fi" or may download a batch of received EPC's when physically attached to the Savant computer system and/or the network, such as through a docking station. The Savant computer system sends the received EPCs 500a, 500b to an Object Name Service 524. The Object Name Service 524 then returns an address 520a, 520b for a Product Markup Language ("PML") server 526 containing asset information 522 for each given EPC. Using the received address, the Savant computer system may contact the PML server 526 to retrieve and/or update the asset information 522.

Simple ID tags may only be able to send the stored identification data and perhaps receive one or two commands such as "awaken" or "erase stored identification data." More complex tags, although more expensive, can perform many functions, including encryption or authorization checks, writing memory blocks, calibrating sensors, and/or making measurements. The communications 530 between the ID tags and reader are generally through a private protocol idiosyncratic to the tag manufacturer.

SUMMARY OF THE INVENTION

The EPC numbering and asset management system described above, although feasible, is not compatible with existing numbering systems such as SSCCs and ISBNs. Even further, tags are not compatible with current or proposed computer communication protocols. Thus, a communications network, such as the Internet, typically ends at the Savant computer system and does not extend to the tags. Moreover, since identification tags are typically identifiable only through the unique EPC embedded in the IC, a remote computer system is unable to identify the particular reader in contact with a desired tag, and therefore, must rely on external information to determine how to send commands or queries pertaining to the tag.

Embodiments of the invention are directed toward identification ("ID") tag readers and asset management methods which extend the Internet to ID tags. Specifically, a reader service may act as a router with respect to the ID tags within its range. To resolve the information stored on the ID tags into usable data, the reader service may send a query to an ID tag and in response, receive identification data from the ID tag. Based on the received identification data, the reader service may determine an address such as a uniform resource locator ("URL"), for a selected asset lookup service. Based on the determined address, the reader service may send at least a portion of the received identification data to the asset lookup service.

The reader service, providing its router function, may assign a guest identification to each ID tag within its range. The guest identifications, compliant with an IP address format, may allow communication messages to be addressed directly to the individual ID tags from any computer system attached to the network. Further, the guest identification may be registered at a 'home' address of the tag, which may be included in the identification data stored on the tag. Consequently, a tag application may send a query or command to the known home address of the tag, and the query/command may be automatically sent to the tag at its guest identification. Alternatively, a tag application may discover the current guest identification address for a tag 10 and send commands or queries to the guest identification of the tag through the reader service. In this manner, the reader service acts as a router linking the network to the ID tags, allowing packet communication directly with the ID tags. In addition, communication with the ID tags will fall into a settled standard communication protocol with its attendant reliability and security.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The use of mobile computing Internet Protocols ("IP") is growing for many mobile devices including lap top computers, cellular phones, palm computers, pagers, etc. These mobile packet switched devices (as opposed to circuit switched devices) dynamically change their access points to the Internet, thus, making it difficult for standard routing to 'find' these devices in the vast topography of the Internet. To support device mobility, the Internet Engineering Task Force ("IETF") currently standardizes a protocol called Mobile IP for use with the physical layer of the network and specifically mobile devices. Mobile IP, specifically, Mobile IP version 6 ("IPv6") is described in a white paper "Mobile IPv6: Mobility Support for the Next Generation Internet," W. Fritsche and F. Heissenhuber, IABG, (http://www.ipv6forum.com/navbar/papers/MobileIPv6_Whitepaper.pdf), August, 2000, and "Mobility Support in IPv6," D. Johnson, C. Perkins, and J. Arkko, IETF draft request for comments, (http://www.ietf.org/internet-drafts/draft-ietf-mobileip-ipv6–24.txt), which are incorporated herein by reference.

Figure 3:
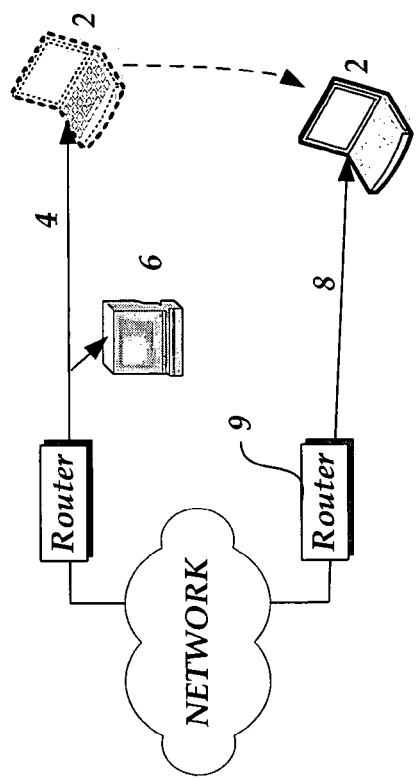
FIG. 3 is a schematic diagram of an example mobile IP network of the prior art.

Generally, FIG. 3 illustrates a simplistic mobile system of the prior art. As shown in FIG. 3, while a mobile node 2 is away from its home link 4, it is assigned a care-of-address by the current router 9. The care-of-address indicates the mobile node's current location on the Internet on link 8 and is either derived from the receipt of router advertisements (stateless address configuration) or is assigned by a dynamic host configuration protocol server. Upon establishing the care-of-address, the router 9 sends a binding message to the home agent 6 assigned to the home link 4. The binding message communicates the care-of-address and the mobile node's home address. The home agent 6 intercepts packets addressed to the mobile node 2 and sends the packets back through the network to the mobile node's present location at its care-of-address on link 8. The Mobile IP standard increases reliability and security of the message traffic to mobile devices.

Figure 1:
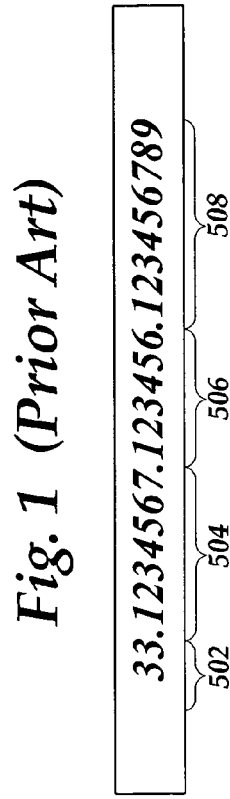
FIG. 1 is a table of an example EPC of the prior art.
Figure 2:
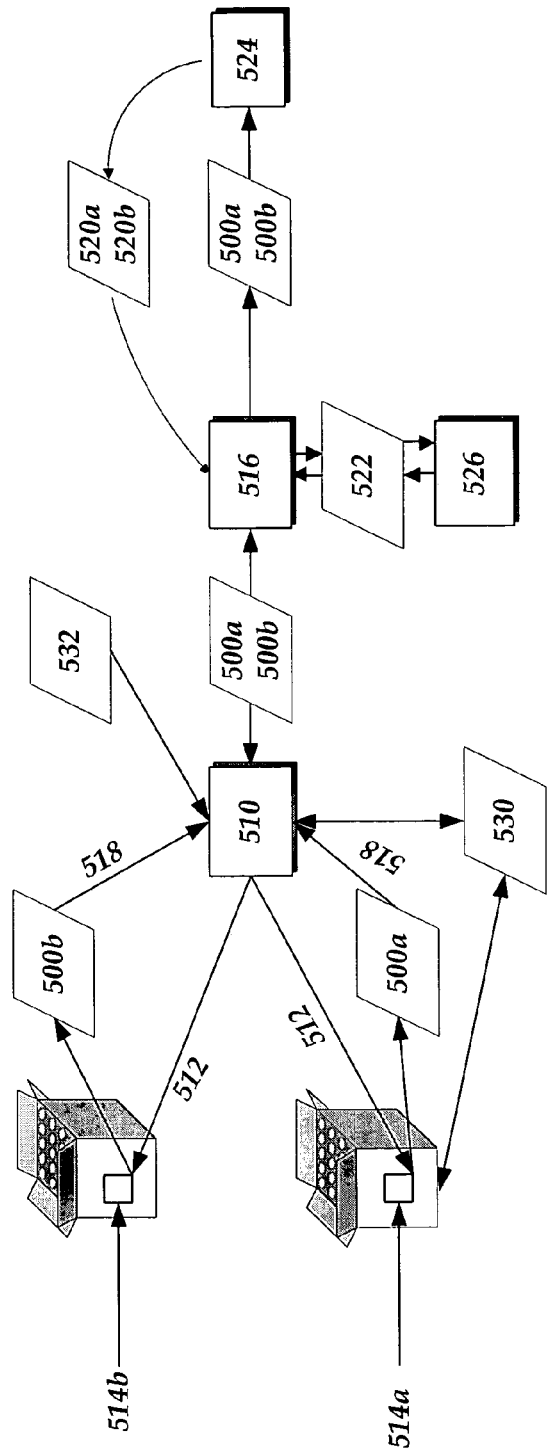
FIG. 2 is a dataflow diagram of an example EPC system of the prior art.
Figure 4:
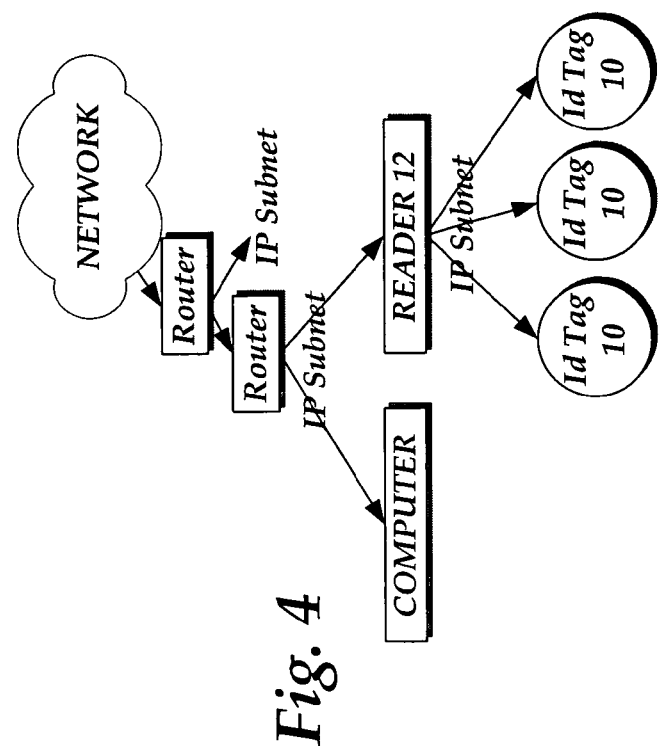
FIG. 4 is a schematic diagram of an example network of identification tags in one embodiment.

Generally in the prior art, Mobile Protocols have only been applied to computing devices which require frequent user input or evaluation through a user display including, but not limited to, lap tops, palm computing devices, pagers, cell phones, and readers of ID tags etc. In the prior art, a reader of identification tags is an endpoint on the network and tags are not addressable on the network. In contrast to the prior art, as shown in FIG. 4, the network may be extended to the ID tags and a reader service 12 may provide a portion of the router processes within an adapted mobile protocol for communications directed to the ID tag 10 through reader service 12 from the network. In this manner, identification tags become nodes on the network addressable through protocols such as standard protocols including Mobile IP, rather than through proprietary protocols. Consequently, the physical layer of the network is transformed to include the ID tags 10 and the protocol layer maybe virtually transformed from a private protocol to a standard network protocol, such as Mobile IP.

Figure 5:
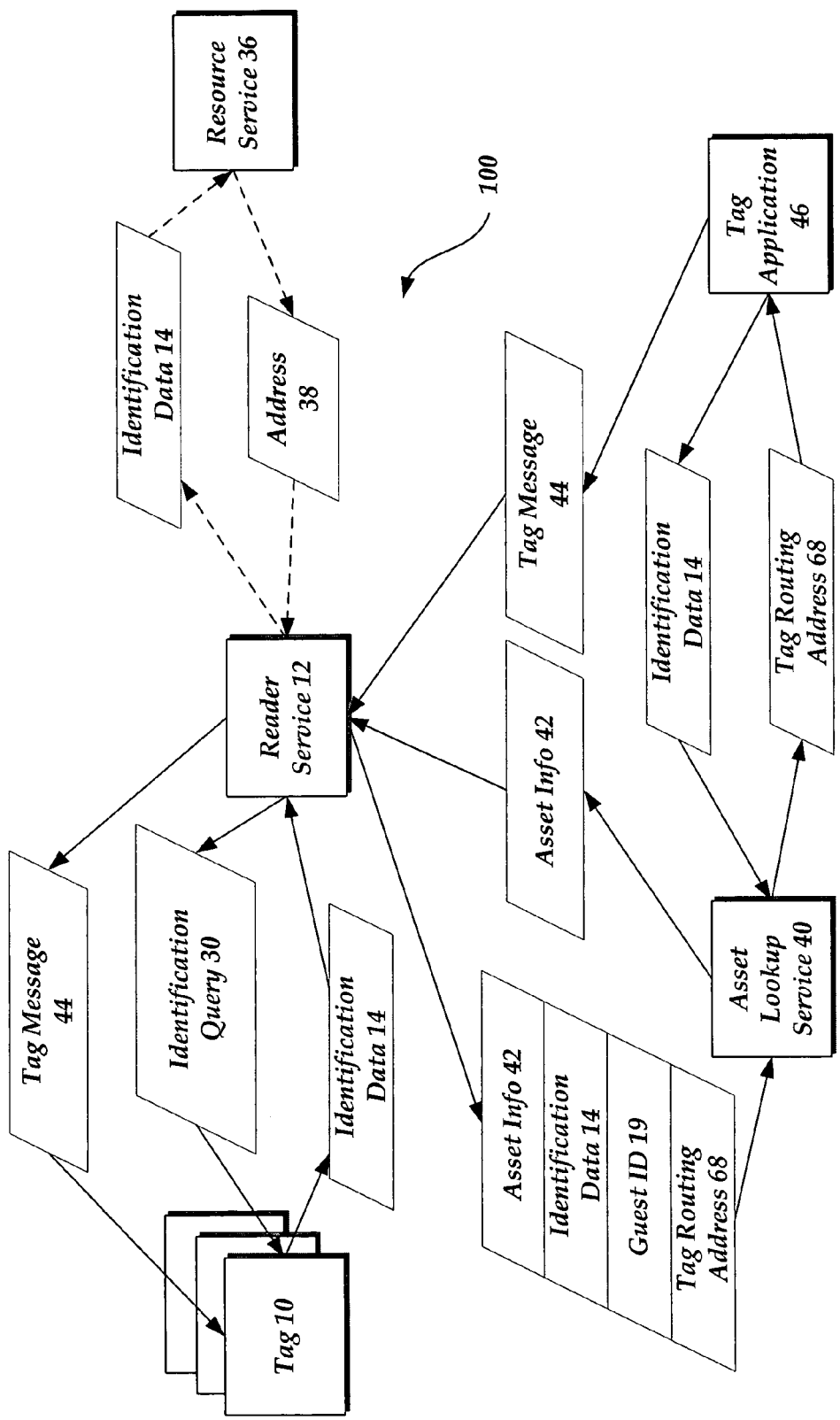
FIG. 5 is a dataflow diagram of an example asset management method in one embodiment.

FIG. 5 illustrates an example asset management system 100. Asset management, as noted above, identifies assets and includes but is not limited to tracking retail or wholesale products in transit or as they are being purchased by a consumer, tracking payment of tolls by vehicles at a tollbooth, allowing or denying access to personnel, identifying and/or tracking pets, identifying and/or tracking parolees, etc. There are many different kinds of asset management systems which differ in what assets are being identified and how they are tracked. There may be different asset managers over the complete lifetime of the asset, and moreover, there may be multiple asset managers at the same time interested in the same asset. For example, an asset manufacturer may attach an identification tag 10 to a manufacturing part to track the manufacturing process, address any bottlenecks or other manufacturing concerns, and/or track assets through retail sale for recall and/or marketing purposes. The distributor may monitor the identification tag 10 attached to the finished asset and/or a logistics unit of assets from the manufacturer to delivery at a retail outlet by the distributor. The retail outlet may monitor the same asset through the distribution process, monitor the asset as inventory in its warehouse and stock on its store shelves to assist in restock and check out. The purchaser may also practice asset management in tracking items at locations and or tracking the age/freshness of items in storage.

Although FIG. 5 illustrates the reader service 12, the asset lookup service 40, and resource service 36 as singular services, the functions and/or processes of each service (described further below) may be implemented by multiple computer systems and/or databases acting as multiple services providing overlapping or complementary processes discussed herein. In one embodiment, the asset lookup service may be provided by multiple databases residing on multiple computer systems, each database providing a portion of the functionality described below or alternatively, the multiple computer systems may overlap in functionality to provide redundancy in the asset management system. Similarly, in one embodiment, the reader service may be implemented on multiple computer systems, each system providing a portion of the services of the reader system 12 discussed above. The distribution and redundancy of functionality for each system may be a function of processing requirements, storage requirements, or any performance characteristic of the asset management system.

The asset management system of FIG. 5 resolves the identification data 14 on the ID tag 10 with a reader service 12. Like the prior art EPC system, a reader service 12 interrogates the tag 10 by sending an identification query 30. The query may be any data or signal indicative of a query to an identification tag to respond with its stored identification data 14. The identification tags 10 within the reader's range may respond with identification data 14. For example, in RFID, the reader service 12 sends a signal through a transceiver over a radio frequency communication channel which is detected by the tags within its transmission frequency range. The signal may be unmodulated or modulated, matching the capabilities of the identification tags 10 under interrogation. Although any frequency may be suitable for use with RFID, transmission frequencies are regulated by the FCC. Thus, according to International Standard Organization standards for RFID within the unlicensed bands of the FCC, high frequency transmissions will typically occur at approximately 915 MHz or 13.36 MHz, low frequency transmissions will typically occur at approximately 125 kHz and microwave radio transmissions will typically occur at approximately 2.46 GHz or 5.8 GHz. Other frequencies may be appropriate, including sonic, optical, infrared, and ultraviolet. Communication methods, other than RFID, may also be suitable with various identification tags, including magnetic readers, visual inspection, laser readers, etc. Depending on the exact technology and system configuration, anti-collision methods may be used to allow a reader service to read more than one tag within its range as well as allow multiple reader services to interrogate adjacent or identical tags.

The identification data 14 received from the identification tag may include a global routing prefix 604, an asset identifier 20 which may include an asset type identifier and/or serial number. The identification data 14 may also include an optional tag index 16. The identification data 14 may be stored and/or communicated to the reader service in any suitable format. For example, the identification data 14 may be stored and/or communicated in a data structure which is compliant with a standard Internet Protocol address, such as an Internet Protocol version 6 address format shown in FIG. 6.

Figure 6:
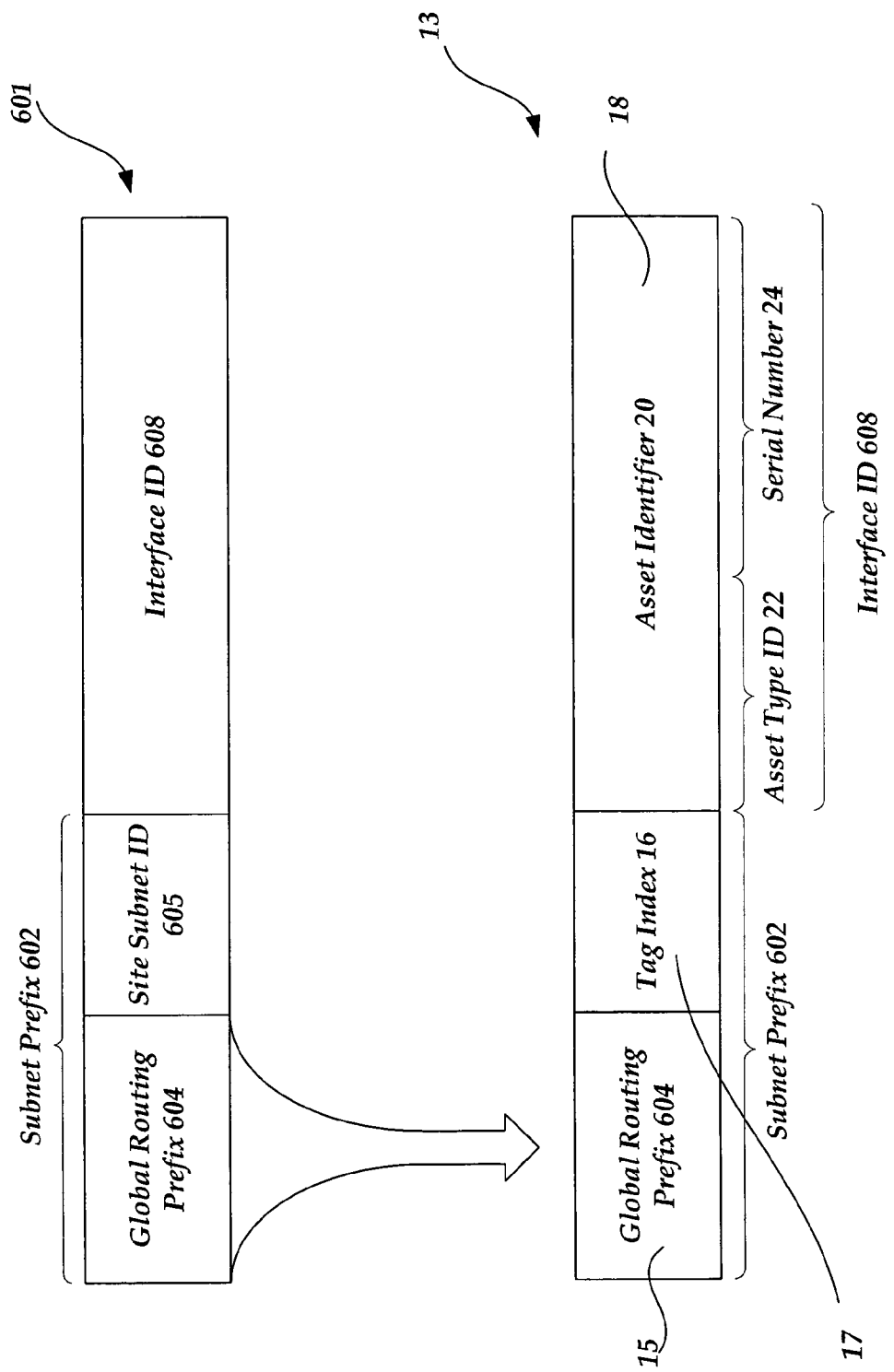
FIG. 6 is a table of an example Internet Protocol address of the prior art and an example identification data structure in one embodiment.

As shown in FIG. 6, a standard Internet Protocol address 601 of the prior art typically includes three fields: a global routing prefix 604, site subnet identification 605, and an interface identification 608. The global routing prefix 604 and site subnet identification 605 together form a subnet prefix 602. The global routing prefix is generally issued by an Internet registry whereas the site subnet identification and the interface identification are typically assigned by the owner of the address. In this manner, the global routing prefix 604 forms a public address space and the site subnet identification 605 and interface identification 608 form a private address space. It is to be appreciated that the term interface address includes any unique identifier field of an IP address which identifies a particular connection to a network within a particular subnet. For example, under Internet Protocol version 4, the interface identification 608 may include a host identifier.

FIG. 6 also illustrates one example of a data structure 13 compliant with a standard network protocol address for storing and/or communicating identification data 14 from an identification tag. As shown FIG. 6, the data structure 13 may include a first data field 15 containing data representing the global routing prefix 604 which is compliant with standard Internet Protocol addressing schemes. Under IPv6 in the prior art, the site subnet identifies the subnet for routing to the end user and the interface identification identifies the particular host on the subnet. However, since the site subnet and interface identification are not needed to identify a subnet or host on a network, those data fields, in one embodiment, may be used to store identification information for an asset, such as for asset management. For example, the second data field may be set to a predetermined and/or fixed value representing a tag index 16, thus, reserving a branch of the available private address space to contain asset identification information. In this manner, the second field 17 of the IP address holding the value of the tag index 16 would no longer indicate a routing location for packets, but would rather indicate that the IP address itself contained identification information about an asset. In one example, the tag index contains 16 bits which are all set to 1, e.g., FFFF in hexadecimal notation. It is to be appreciated that the tag index 16 may contain more or fewer bits, either allowing for alternative field sizes for the global routing prefix and/or the interface ID fields within or outside the IP address format. Other tag indexes may include FF (only 8 bits) or any other predetermined code of any length which may indicate that the data structure, an IP address in this embodiment, contains asset information rather than a routing location of the asset.

As shown in the illustrative example, the third data field 18 contains data representing an asset identifier 20 which indicates a property of the asset rather than an interface identification indicating a particular host on a network. In this manner, the Interface ID field 18 holding the asset identifier is independent of a routing location on the Internet. The asset information may include, for example and without limitation, a product code, a serial number, a shipment number, a manufacturing date, a batch number, a version number, a manufacturing or shipping facility identifier, a name or contact information such as a URL or phone number. As shown in FIG. 6, the asset identifier 20 may include an asset type identifier 22 and a serial number 24. The asset type identifier 22 may indicate a general property of the asset which is common to multiple assets, for example, the type of asset, e.g., a 12 amp vacuum cleaner; the size or weight of the asset, e.g., container carrying 25 tons of cargo; a product model or version, e.g., Windows® version 1.0; a personnel pass for access to particular areas; the color and/or size of a type of apparel, e.g., a large red shirt; a logistics unit of at least one asset, e.g. a container, pallet, or case of asset(s); geographic location for distribution or manufacture, e.g., Windows® for Japanese users; personal information and/or credit charge data for product purchase; entry and exit time for vehicle toll payment; and/or any other property or descriptor of an asset under asset management. In this manner, the same data structure may be used for asset management of not only single assets (like the EPC), but also shipping units (like the SSCC) and/or other asset management systems. The serial number 24 may indicate a specific and unique asset within that asset type e.g., Windows® version 1.0 with product serial number AB123456XYZ; the asset geographic location, e.g., distribution center in Peoria; the asset age or manufacture date; or an asset environment descriptor, e.g., the current temperature of the tag 10.

Although the above example is discussed with reference to a data structure 13 compliant with an IPv6 address format, it is to be appreciated that other versions of Internet Protocols and other computer addressing schemes may be suitable for identifying assets in an asset management method and include message authentication code ("MAC") addresses, 64-bit extended unique identifier (EUI-64) or any addressing format. Moreover, it is to be appreciated that the data structure 13 may not comply with any IP address format while containing a global routing prefix, an asset identifier and/or any other asset information placed in predetermined fields or bits.

Although the data structure 13 for communicating the identification data 14 illustrated in FIG. 6 may be compliant with Internet Protocol addressing schemes, it does not indicate a current routing location of the identification tag on the Internet. To support communications with the tag 10 from a network, the tag in the embodiment shown in FIG. 5 may be treated as a mobile node and assigned a dynamic IP address for the time it is accessible by the reader service 12 at a particular routing location. For example, as shown in FIG. 5, the reader service 12 may assign a guest identification 19 to the ID tag 10. The reader service then maintains a database which stores the correlation between the received identification data 14 and the assigned guest identification 19.

The guest identification 19 is any data or signal indicative of the location of the identification tag 10 on a network. For example, the guest identification may form a portion of a dynamic tag routing address which may be compliant with a standard Internet Protocol address, including IPv6, IPv4, and any other standard IP format. In one example, the tag routing address may be compliant with a care-of-address of a mobile Internet standard.

In one embodiment, the guest identification 19 may be a complete Internet address for temporary use by the tag when in contact with the reader service 12. Alternatively, to form the dynamic tag routing address, the guest identification 19 may be concatenated with at least a portion of the IP address of the reader service 12 to form a complete routing address compliant with the attached network. For example, the reader service 12 may be assigned an IP address with a typical subnet prefix. The guest identification 19 assigned to each tag may comprise a unique interface ID which may be concatenated to a portion of the Internet address of the reader service, such as the reader subnet prefix (e.g., the global routing prefix and site subnet identification of the reader service). In the example embodiment shown in FIG. 7, the reader address 60 contains a global routing prefix 62 and a site subnet identification 64 forming a reader subnet prefix 66. The reader address 60 also includes an interface identification 70. The guest identification 19 assigned to the identification tag may form an interface identification compliant with the IP address of the reader service. The dynamic routing address for the tag may be determined by concatenating the reader subnet prefix 66 with the guest identification 19 to form a tag routing address 68. In this manner, the tag routing address 68 identifies the tag as an IP host to the attached network, and identifies how message traffic should be routed to the tag 10 through reader service 12.

Figure 7:
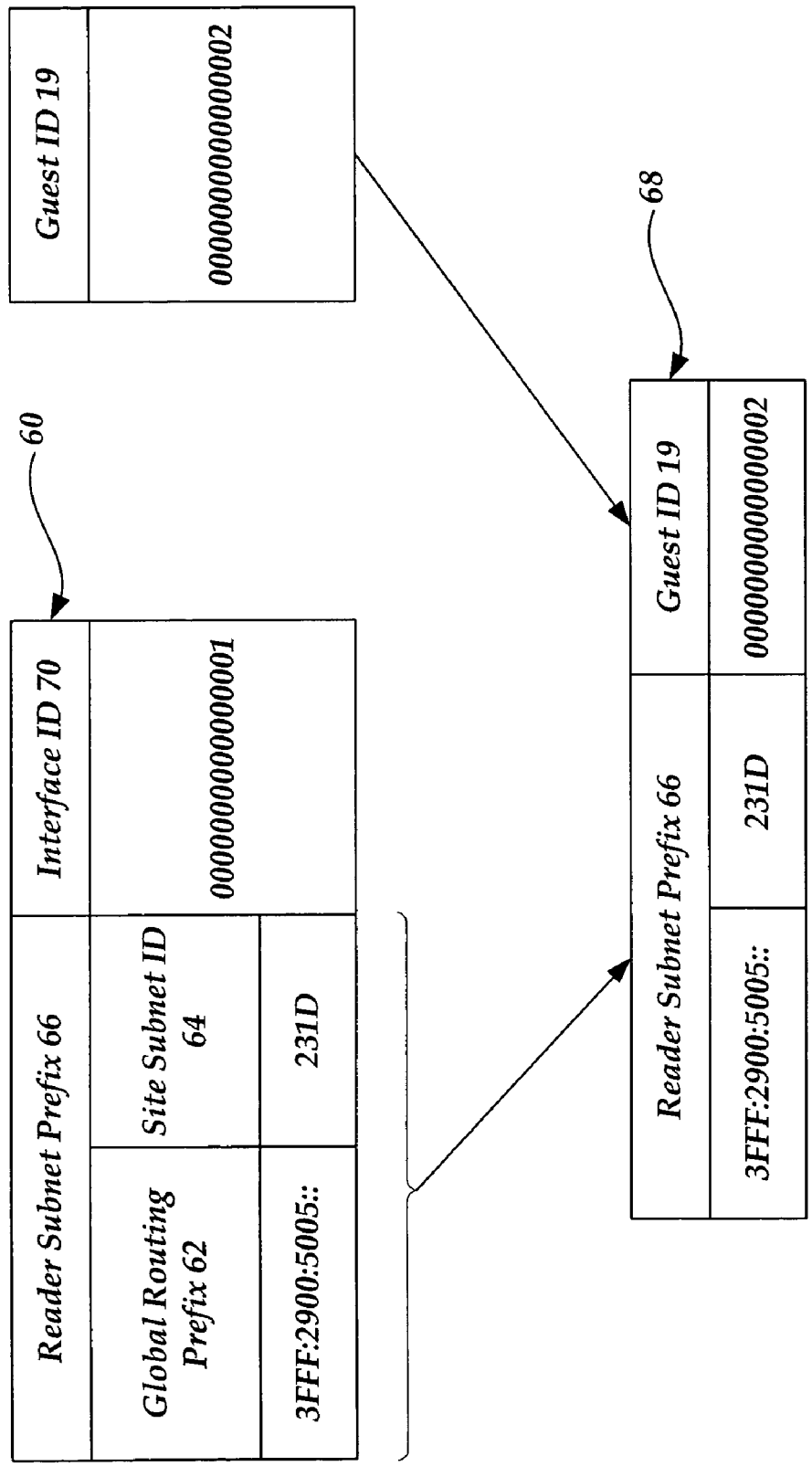
FIG. 7 is a diagram of an example tag routing address in one embodiment.

In the illustrative embodiment of FIG. 7, the reader address 60 comprises the reader subnet prefix 66 with an interface identification 70 value of "1". The guest identification 19 may then be assigned an interface identification value between 2 and the maximum given the number of bits allotted to the guest identification. The reader subnet prefix concatenated with an interface identification value of "0" may be reserved as an any cast address for the reader defined subnetwork.

Figure 8:
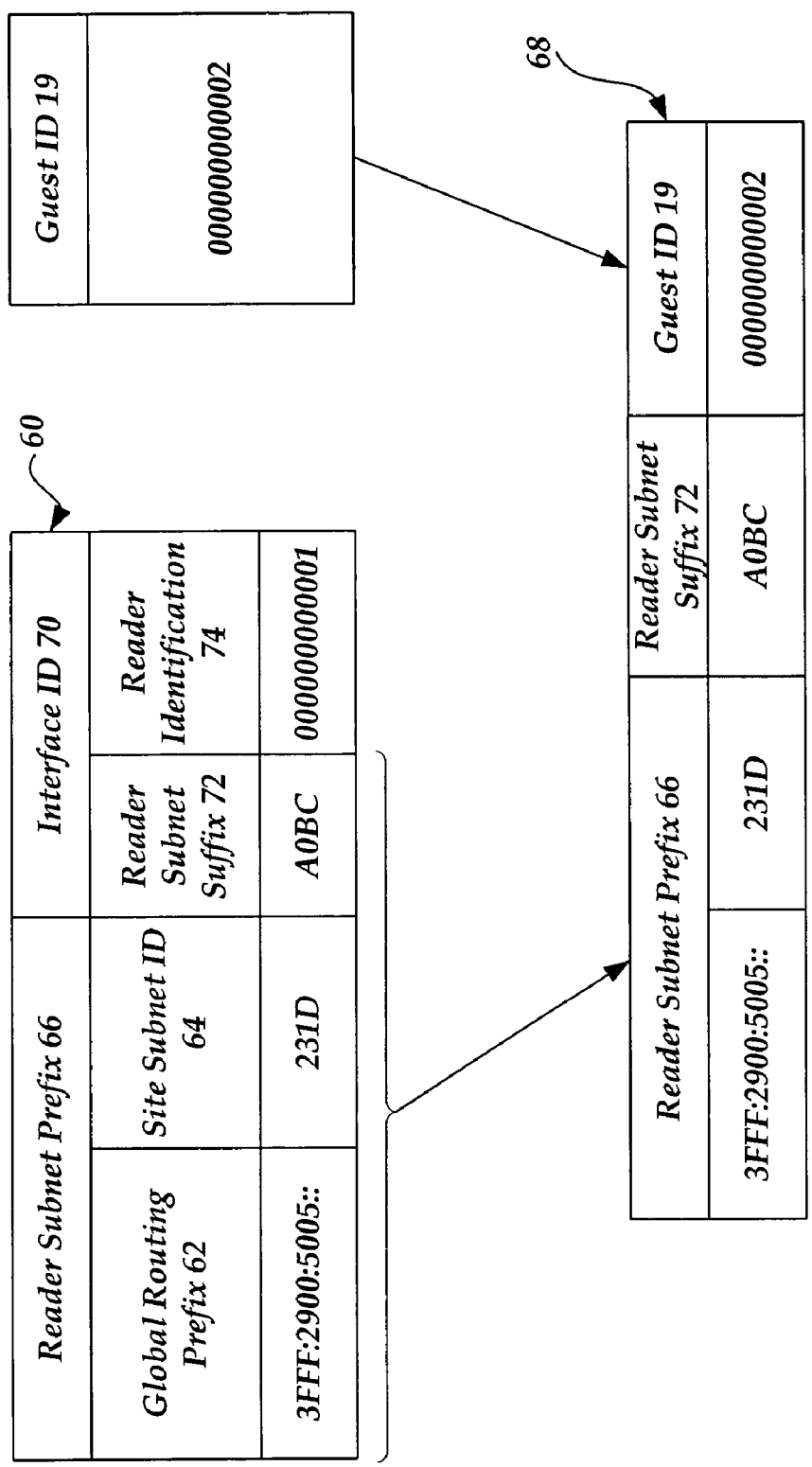
FIG. 8 is a diagram of an example tag routing address in another embodiment.

In another embodiment shown in FIG. 8, the reader subnet prefix 66 may not be unique only to the reader service 12. Rather, subnet prefix 66 may support multiple routers and/or reader services. Thus, in the illustrated embodiment, the last router above the reader service in the attached network may be assigned a site subnet address as normal. The interface identification 70 of the reader is then subdivided into two fields: the reader subnet suffix 72 and the reader identification 74. In this manner, the reader subnet suffix 72 and the reader identification 74 form the interface identification 70 of the reader address 60. The reader subnet suffix 72 may indicate a particular reader attached to the router and the corresponding reader identification 74 may indicate a particular reader service attached to the network. As shown in FIG. 8, the routing location for the tag may be determined by concatenating the reader subnet prefix 66 and the reader subnet suffix 72 with the guest identification 19 to form a tag routing address 68.

Returning to FIG. 8, the reader subnet suffix 66 of the reader IP address 60 may identify a plurality of reader services acting together as a pool of proxy servers, rather than identifying a particular reader service. The reader identification 74 may indicate a particular reader service in the pool. However, when the tag routing address is formed by concatenating the guest ID 19 with the reader subnet prefix and reader subnet suffix, the routing information through a particular and unique reader is lost. In this embodiment, the plurality of reader services may have identical contact ranges such that all of the reader services may contact each tag within the area. Alternatively, the plurality of reader services may track which tags are contactable by each particular reader service and route incoming messages accordingly. To avoid overlapping guest identification assignments, each reader service in the pool may assign guest identifications within a unique range of values and/or may communicate assigned values to other reader services within the pool.

In the illustrated embodiment of FIG. 8, the global routing prefix is 48 bits wide, the subnet identifier is 16 bits wide, the reader subnet suffix is 16 bits wide, and the reader identification 74 is 48 bits wide. It is to be appreciated that other bit widths may be used for any of the fields in the reader and tag addresses, as long as the resulting address is compliant with an Internet Protocol addressing format, which in the illustrated embodiment is IPv6.

Returning to FIG. 5, the reader service 12 may send information regarding the tag 10, such as the assigned guest identification and/or other known or determinable information to inform the network of the tag's dynamic address and update stored records regarding the tag. The reader service 12 may also receive information regarding the tag from stored records. To receive and/or send information regarding the tag 10 and/or asset, the reader service 12 may determine an address 38, such as a URL, for a selected asset lookup service 40 for each received identification data 14 as shown in FIG. 5. The asset lookup service 40 maintains at least one database which stores specific asset information 42 for a given asset identified by identification data 14. As noted above, the asset lookup service 40, in one embodiment may be provided by multiple databases residing on multiple computer systems. For example, the asset lookup service may provide information such as the identification and/or characteristic information pertinent to the asset, the asset's history, and/or network address information for the asset.

The reader service 12 may access the asset lookup service 40 through the address 38. The reader service may then retrieve stored asset information 42 for a given identification data 14 to provide asset management. Additionally, the reader service may access the asset lookup service to update the asset information 42 with data known or determinable by the reader service. The asset information 42 may be received by the reader service and/or the asset lookup service in any number of ways, including but not limited to, any data or signal discernable by the reader service and/or asset lookup service as asset information, such as a message in any format of any computer communication protocol.

The asset information 42 may be any data or signal indicative of the asset information, for example, dynamic asset information (e.g., asset environment measurements), temporal asset information (e.g., asset geographic location which may include the geographical location of the reader accessing the ID tag 10, asset Internet routing location of the tag which may include the guest identification 19, sales status, etc.), static asset information (e.g., serial number, model, product type, weight, etc.), and/or other information (e.g., information about the reader accessing the ID tag and historical values of stored temporal and/or dynamic information). Additionally or alternatively, the updated asset information may be incorporated into a dynamic serial number with fields indicating the specific dynamic, temporal, static and/or other asset information.

In the example embodiment of FIG. 5, the asset lookup service may perform the processes of the home agent since it may be controlled by the asset manager and as noted above, maintains a database associating the identification data 14 of each tag with the tag routing address 68. Thus, when the service updates the asset information database of the asset lookup service, the binding update of the dynamic care-of-address under Mobile IP is also updated. Alternatively, the home agent may be performed by a service separate from the asset lookup service. To inform the home agent of the tag's dynamic routing address 68 (analogous to the care-of-address under Mobile IPv6), the reader service 12 may use home agent discovery under Mobile IPv6, or any other suitable process, to determine the IP address of the home agent to receive the binding update.

When the reader service sends a binding update communicating the tag routing address 68, networked servers and host systems are allowed to contact the tag directly. For example, as shown in FIG. 5, knowledge of the tag routing address 68 allows a tag application 46 to address messages 44 directly to the tag 10. Thus, a tag application 46, knowing the tag routing address 68, may send packeted messages 44 directly to the tag through the reader service as long as the reader service remains in range of the desired ID tag. The tag messages 44 may be any signal or data indicative of information, instructions, queries or requests to the tag, including rewriting the tag storage space, erasing the tag storage space, turning the battery on, turning the battery off, calibrating sensors, making a sensor measurement, performing encryption or any authorization or management checks. It should be appreciated that the tag application 46 may be performed by any computer system including the asset lookup service, the resource service (discussed further below with reference to FIG. 5), the reader service, and any computer system desiring to communicate with the tag 10 and/or reader service 12.

To determine the tag routing address 68, the tag application 46 may contact the asset lookup service and request the tag routing address for the desired tag which is identified by particular asset identification data 14 as shown in FIG. 5. If the reader service 12 has updated the asset information database, the asset lookup service may return the tag routing address to the tag application. Alternatively, rather than requesting and receiving the tag routing address, the tag application may send the tag instructions 44 directly to the asset lookup service 40 which may forward the tag instructions to the service 12 and, consequently, to the tag 10.

In the illustrated embodiment discussed above with reference to FIG. 6, the identification data 14 may be compliant with an Internet address format and may be used by the tag application to address the tag instructions. As noted above, the data structure 13 containing identification data 14 does not represent an actual routing location of the ID tag 10 since the tag is mobile. However, the identification data 14, compliant with an Internet address, may be a routing location on the Internet for a home address of the mobile ID tag compliant with a home address of a mobile node in Mobile IP. In this manner, the identification data 14 may be not only an identifier of properties of the attached asset, but may also be a persistent home address for the identification tag. For example, using Mobile IPv6, the tag may be considered the mobile node. The subnet prefix 602 (shown in FIG. 6) of the identification data 14 may be the IPv6 home subnet prefix and the data structure 13 may be the tag's home address. In Mobile IPv6, a home agent, including at least one router, may implement the home link using the home subnet prefix 602 of the tag. The home agent, such as the ALS, may initialize and maintain a database with the bindings of the tags controlled by that asset manager, e.g., manufacturer, distributor, retailer, owner, and/or other controller with an interest in managing the tags attached to assets.

The bookkeeping and forwarding processes of Mobile IP may be used to direct the tag instructions 44 from a tag application 46 to the tag 10. The communication may be forwarded through the home agent, such as the asset lookup service, or sent directly to the tag at its dynamic tag routing address 68 if the network (and its attendant routers) have been notified of the binding of the tag home address (e.g., the identification data 14) with the dynamic tag routing address 68. Additionally, Mobile IPv6 provides mechanisms for caching the binding updates of the dynamic tag routing address 68 so that an originating correspondent, such as a tag application, can route packets directly to the current subnet of the tag (i.e., through the reader service 12) without having to send the packets all the way back to the home agent to be forwarded. A Mobile IP may also provide a mechanism to send a batch of binding updates for consecutive or non-consecutive IP addresses to a home agent. Batch binding updates may reduce network traffic when a single reader detects a plurality of tags, such as when a pallet of goods enters a distribution warehouse. Consequently, a Mobile Addressing System, such as Mobile IPv6, may provide mechanisms for handling the bookkeeping and forwarding of messages addressed to the home address of a mobile host (e.g., addressed to the identification data 14 of the tag 10) and the retention and bookkeeping of addresses when the mobile nodes (ID tags 10) interrupt and renew communication connections with readers. In this manner, the Mobile IP standard, such as Mobile IPv6, will forward message traffic to the correct dynamic tag routing address according to the mechanisms of the standard Mobile IP.

When the identification tag, in one embodiment, leaves the transmission zone or stops responding, the reader service may note this fact and perform whatever cleanup is necessary, which may be compliant with Mobile IPv6. For example, the identification tag may move outside the contact range of a first reader service. If the first reader service detects that the identification tag is not responding, the first reader service may update the asset information database of the asset lookup service, which may be compliant with a binding update of Mobile IPv6. The first reader service may retain the identification data 14 for a period of time and may periodically ensure that the tag is out of range. As the tag moves within the range of a second reader service, that second reader service may then update the asset information database of the asset lookup service and assign a new guest identification. The asset lookup service may then notify the first reader service of the new tag routing address so that the asset lookup service and/or the first reader service can forward any received message traffic to the tag at its new routing location on the network.

Generally, a passive tag includes an IC and an antenna, both using the power of the signal from the reader to respond with the identification data 14. An active tag typically includes an IC, antenna, and a battery. In some cases, the battery powers the IC's circuitry and the broadcast response signal to the reader. Alternatively, some active tags use the battery only to run the IC's circuitry, and like the passive tag, use the power from the signal from the reader to respond. In either the active or passive tags, the IC is a fairly simple circuit to lower costs and to limit the power requirements. Thus, the ID tag 10 may not support very many message protocols. In one example, the identification tag may implement a true IP stack supporting a small set of messages, including but not limited to user datagram protocol ("UDP") and/or transmission control protocol ("TCP") messages. Alternatively, the tag 10 may have a specific and limited set of messages in a private protocol predetermined by the asset manager and/or tag manufacturer. For example, the network may believe that the tag may receive and interpret UDP messages with a limited command set. However, when the reader service 12 in contact with the tag 10 receives any message traffic directed to the tag routing address 68, the reader service may transcode the message into the private protocol of the identification tag. The reader service may send the message to the tag as required. The tag's reply, if any, is sent by the tag in response to the communication or command traffic from the reader service and may be further transcoded into a message by the reader service to be forwarded over the network as appropriate. Rather than sending all message traffic to the tag addressed with the tag routing address 68, the reader service may read and analyze the message traffic. The reader service may recognize that the command does not require interaction with the tag 10, but may be performed by the reader service itself. For example, identifying the geographic location of the reader service, responding to a binding update request, and communicating the IP address of the reader service may not require interaction with the tag 10. Thus, rather than ask the tag if it knows the geographic location, the reader service may reply to the sender with the requested information without further communication with the tag. In this manner, communication with the tag may be reduced to preserve battery power and bandwidth usage As discussed above with respect to FIG. 5, the reader service 12 may access the asset lookup service 40 through a address 38, such as a URL. In one example, the reader service 12 may self determine the address 38 by receiving a global routing prefix or Internet address as a portion of the received identification data 14 from the tag 10 as noted above with respect to FIG. 6. To support asset management, the asset manager may set up an IP address with its global routing prefix 604 and a predetermined site subnet ID and Interface ID to point to its selected asset lookup service. For example, the reader service 12 may append a predetermined suffix, such as ALS.aspx, to a received global routing prefix to format qa URL for the asset lookup service 40.

Alternatively, as shown in FIG. 5, the reader service 12 may resolve the identification data 14 to an address for an asset lookup service by interrogating a predetermined resource service 36. For example, the reader service may contact a predetermined address, such as a URL, pointing to the resource service 36. The resource service correlates each registered identification data 14, or portion of the identification data, such as an asset identifier 20, with an address 38 provided by the asset manager controlling the asset. In this manner, the resource service 36 returns an address for each provided identification data 14. In one example, the resource service may be provided by a Universal Description, Discovery, and Integration Business Registry ("UBR"). UBRs are currently operated by International Business Systems, Microsoft, and SAP. It should be recognized that various server systems may maintain a resource database correlating each identification data 14 with the address for the selected lookup service provider, including the asset manager itself.

An example implementation of an asset management method will now be described with reference to FIGS. 9–15.

The reader service 12, asset lookup service 40 and resource service 36, illustrated in FIG. 5, all may be present and operating on one or more computers or other devices acting as a reader service for the identification tag 10, an asset lookup service for a reader service and/or tag application, and/or a resource service for the reader service. As noted above with respect to FIG. 5, each of these services may be provided wholly or partially on multiple computer systems or other devices to provide the processes discussed above.

In the illustrated embodiment, the reader service 12 is provided by a reader system 200 which will be discussed below with reference to FIGS. 9–10 and 13–14. In the illustrated embodiment, the asset lookup service 40 is provided by an asset lookup server 300 (discussed below with reference to FIGS. 11–12 and 15) and the resource service 36 is provided by a resource server which is discussed further in co-pending application titled METHOD AND IDENTIFICATION TAG FOR ASSET MANAGEMENT, filed on the same date as this application/patent, and having attorney docket number 307217.01/MSFT1122174, which is incorporated herein by reference. The tag application 46 may reside on any system and its implementation should be apparent to one of skill in the art. The asset lookup server 300, the resource server, and the system running the tag application 46 may be networked systems accessed by the reader system 200 in any manner known in the art (e.g., via the Internet).

Figure 9:
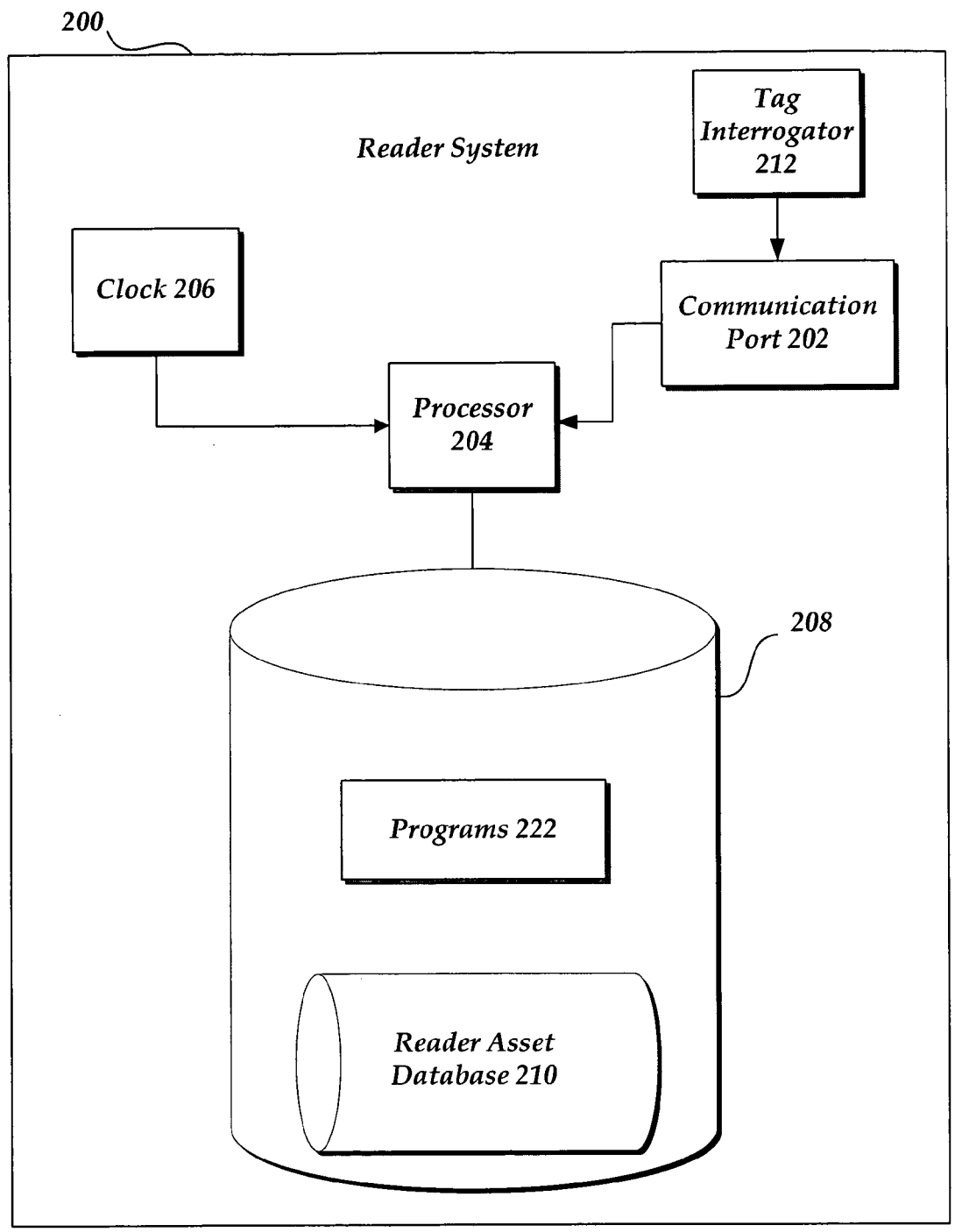
FIG. 9 is a diagram of an example reader system in one embodiment.

As shown in FIG. 9, the reader system 200 may include one or more communication ports 202 which may include a tag interrogator 212 such as a transceiver, magnetic strip reader, laser reader, optical character recognition device, or other device suitable to determine tag information from tag 10. The reader system 200 also includes one or more processors 204, an internal date and time clock 206, and storage 208 which includes one or more computer programs 222 defining instructions, which when executed, instruct the computer to perform the operations of the reader service 12. The storage also may include a reader asset database 210. The reader asset database will now be described in more detail in connection with FIG. 10 and the programs 22 will be discussed further below with respect to FIG. 13.

Figure 10:
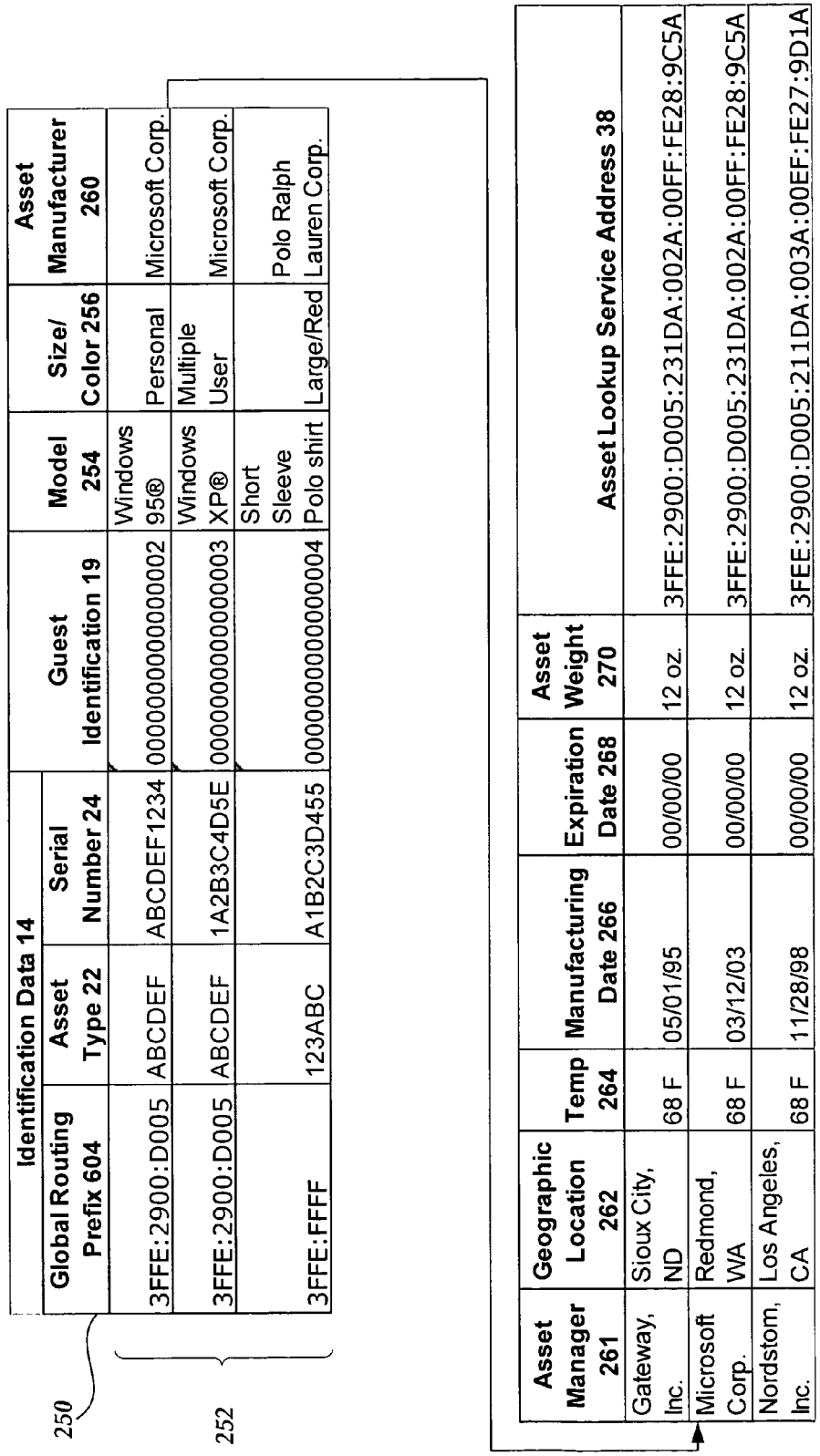
FIG. 10 is a diagram of an example table for a database of assets in one embodiment.

FIG. 10 illustrates an example table 250 for the reader asset database 210, which includes one or more records 252. In general, each record associates identification data 14 with additional information about the asset. In this example, each record 252 includes identification data 14, guest identification 19, model 254, size/color 256, asset manufacturer 260, asset manager 261, geographic location 262, temperature 264, manufacturing date 266, expiration date 268, asset weight 270, and asset receives identification data 14 from each tag 10. The reader system may assign the guest identification 19; however, the tag itself, the asset lookup service, or any system suitable for assigning guest identifications may assign the guest identification. The asset lookup service address 38 is initialized and updated by the reader system and/or the resource service 36 (when existing). The remaining data may be initialized and updated as the asset lookup service 40 provides the asset information 42 when given identification data. Dynamic data, including asset environment such as temperature, etc. and temporal data, such as asset geographic or routing location (e.g., guest ID 19), may be updated by the reader system as it determines or receives that information.

As shown in FIG. 10, the identification data 14 may include a global routing prefix 604 and may be formatted to be compliant as an Internet Protocol address. The identification data 14 may include an asset identifier comprising an asset type identifier 22 and serial number 24. The format and specific contents of the identification data are discussed further in co-pending application titled METHOD AND IDENTIFICATION TAG FOR ASSET MANAGEMENT, filed on the same date as this application/patent, and having attorney docket number 307217.01/MSFTI122174, which is incorporated herein by reference.

Figure 11:
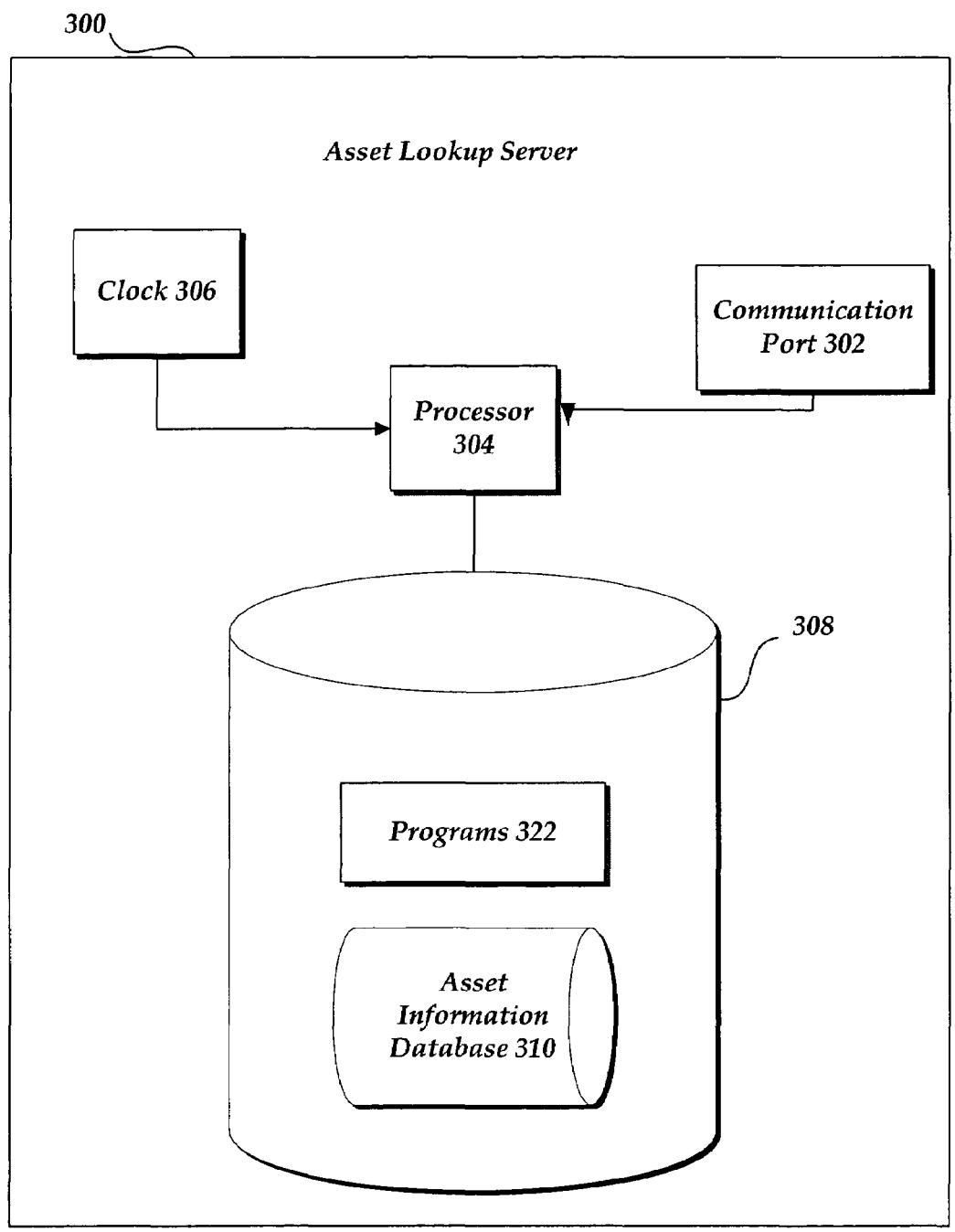
FIG. 11 is a diagram of an example asset lookup server in one embodiment.

As shown in the example embodiment of FIG. 11, the asset lookup server 300 hosting the asset lookup service 40 may include one or more communication ports 302, one or more processors 304, an internal date and time clock 306, and storage 308 which includes one or more computer programs 322 defining instructions, which when executed, instruct the computer to perform the operations of the asset lookup server. The storage 308 also may include an asset information database 310. The asset information database will now be described in more detail in connection with FIG. 12 and the programs 322 will be discussed further below with respect to FIG. 15.

Figure 12:
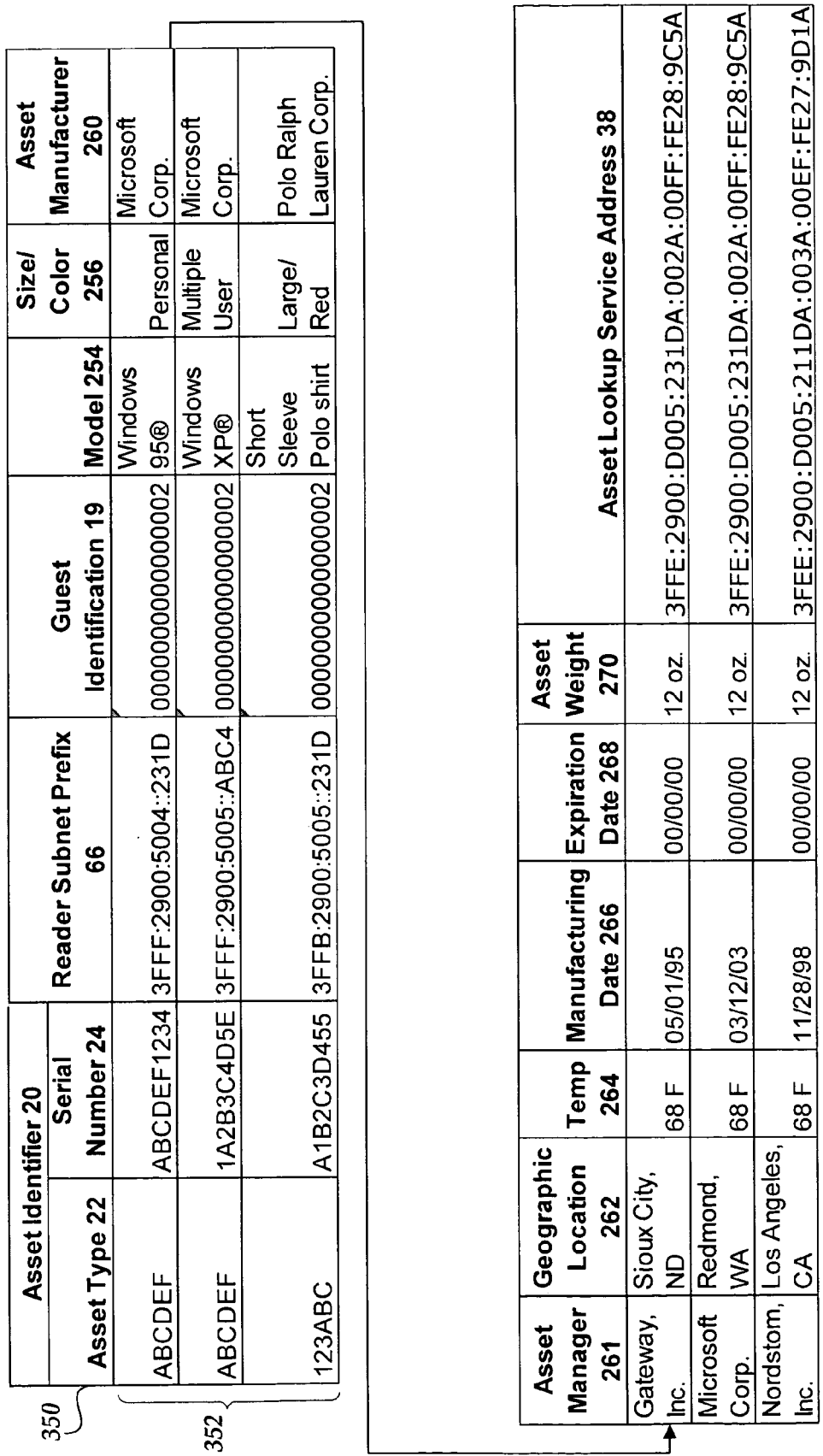
FIG. 12 is a diagram of an example table for a database of asset information in one embodiment.

FIG. 12 illustrates an example table 350 for one embodiment of an asset information database 310, which includes one or more records 352. In general, each record associates identification data such as the asset identifier 20 with specific static, temporal, dynamic and/or other asset information. In this example, each record 352 includes an asset identifier 20 comprising an asset type identifier 22 and a serial number 24. The asset identifier is associated with static information such as model 254, size/color 256, color 258, asset manufacturer 260, manufacturing date 266, expiration date 268; temporal information such as guest identification 19, asset manager 261, geographic location 262; dynamic information such as temperature 264, asset weight 270; and other information such as reader subnet prefix 66 and/or historical information tracking the temporal and/or dynamic information over time. Entries for the static, temporal, dynamic and/or other information in the asset information database may be initialized by an asset manager as the identification tag 10 is associated with a particular asset. As noted above, a particular asset may have multiple asset managers interested in identifying and/or tracking the asset over the lifetime of the tag. Thus, as the asset manager changes through the lifetime of the asset, the temporal and dynamic asset information database records may be updated by an asset manager based upon information received from the reader system or other system.

Each database described above may be any kind of database, including a relational database, object-oriented database, unstructured database or other database. A database may be constructed using a flat file system such as ACSII text, a binary file, or any other file system. Notwithstanding these possible implementations of the foregoing databases, the term database as used herein refers to any data that is collected and stored in any manner accessible by a computer.

Figure 13:
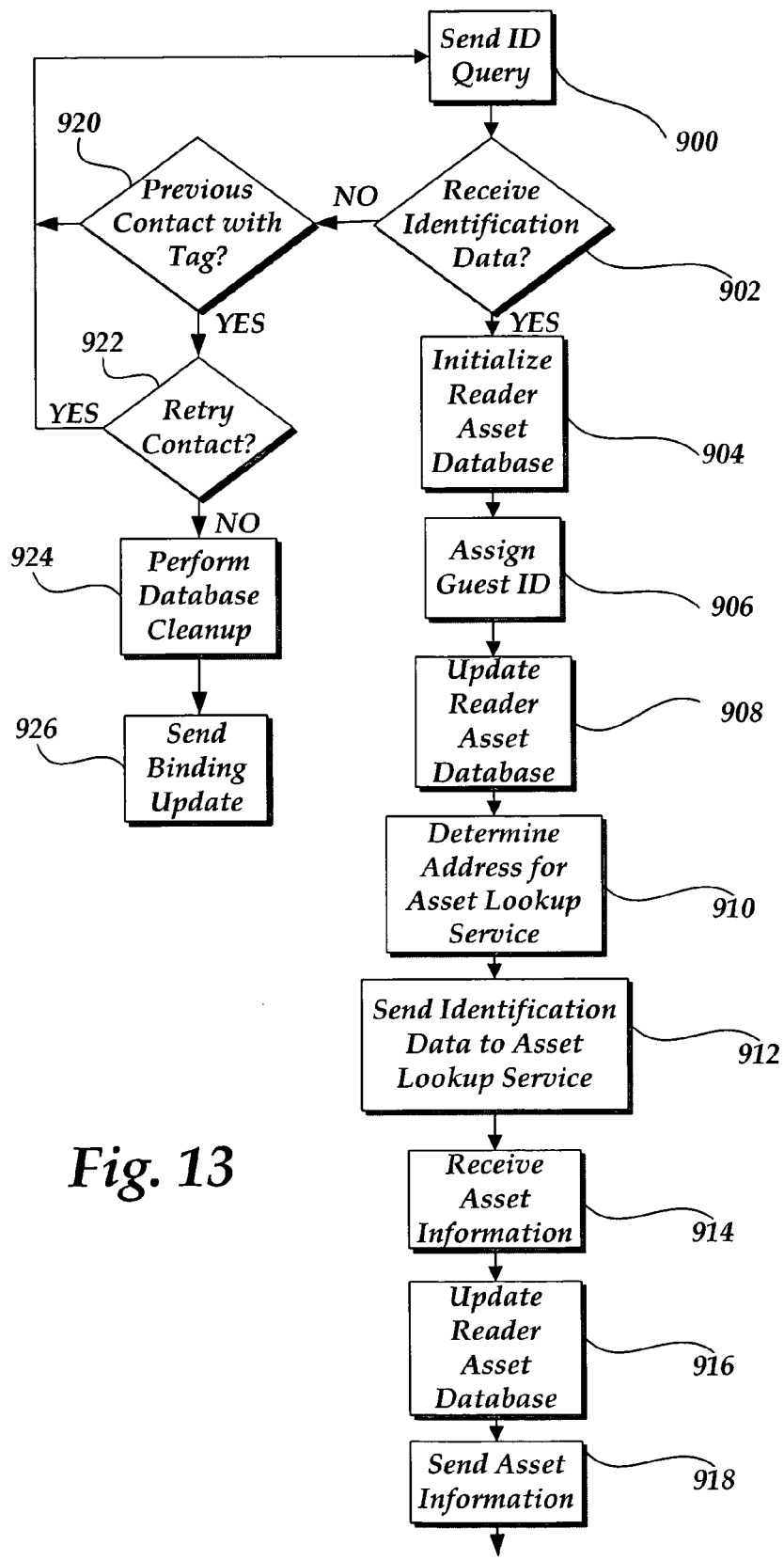
FIGS. 13 and 14 are a flowchart describing how a reader system is performed in one embodiment.
Figure 14:
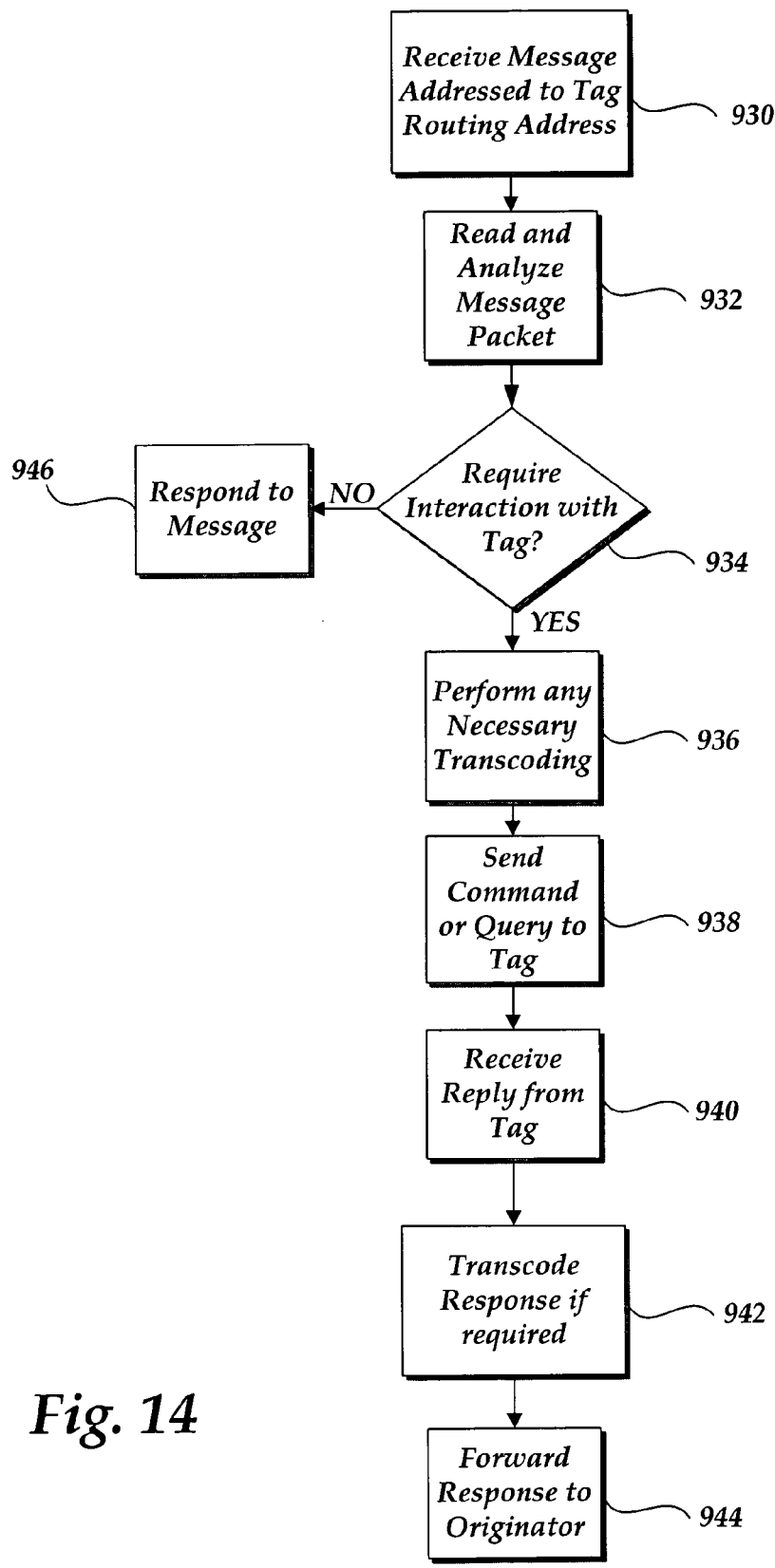

Having now described the databases maintained by the reader system and asset lookup server in this embodiment, the various operations performed by the reader system 200 will now be described. Referring to FIGS. 13 and 14, these operations include, but are not limited to, sending an identification query 900 from the reader system to an identification tag. If the reader system 200 receives identification data 14 (in one example, the data structure of FIG. 6) as determined at 902, the reader system 200 initializes the reader asset database 904. As previously explained, it is to be appreciated that the identification data may be received through any computer readable medium including without limitation modulated or unmodulated radio frequency signals, magnetic readers, laser signals, or through the Internet. Records in the reader asset database of FIG. 9 may be created or updated using the received identification data 14. In one example, the reader system associates the received asset identification data 14 (such as a global routing prefix and/or asset identifier) with other tag information that may be discoverable or known by the reader system.

Referring again to FIG. 13, the operations of the reader system 200 also may include assigning a guest identification to the tag 906. As noted above with respect to FIGS. 7 and 8, the guest identification 19 may be compliant with the interface ID of an IP address, and more specifically, may comprise the entire or only a portion of the interface ID of an IP address. For example, the guest identification may form all or a portion of a care-of-address of a mobile Internet standard. The reader system 200 may select the guest identification 19 using any desired scheme, such as assigning the lowest value available in a series of possible guest identifications as a guest ID 19. For example, using the method discussed in conjunction with FIG. 7, the guest ID 19 may have a value of '2' to a maximum value, depending on the number of bits in the guest ID. In some methods, the guest IDs may be re-used after they have been released. For example, when assigning a second guest ID 19, the reader system may determine if the first guest ID has been released, and if so, reuse that guest ID. In an alternative embodiment, the reader system may select the next consecutive guest ID, and if the maximum has been reached, may reset a counter for guest ID's back to the initial value, assuming that the initial assignments are no longer in use by tags in contact with the reader service 12. Alternatively, the reader system may search the list from the initial guest identification searching for the next available guest identification. Records in the reader asset database of FIG. 9 may be updated (908) with the assigned guest ID. In particular, the reader system associates a particular identification data 14 with the assigned guest ID 19.

The reader system 200 may determine an address for an asset lookup service 910. As described above, in some embodiments, the address 38 of the asset lookup service may be a URL and/or may be determined by the reader system based upon a received global routing prefix of the identification information 14 concatenated with a predetermined suffix, such as ALS.aspx. Alternatively, the reader system 200 may contact a resource service 36 (shown in FIG. 5) to determine the address 38. After determining the address, the reader system sends the received identification data 912 to the site located at the determined address of the asset lookup service. The reader system may then receive (914) asset information 42 (FIG. 5) associated with the identification data 14 stored in the asset information database (FIG. 12) of the asset lookup server 300. Records in the reader asset database of FIG. 9 are updated (916) by the reader system with the received asset information. In particular, the reader system associates a particular identification data 14 with the received asset information 42. As shown in FIG. 12, the asset information 42 may include various combinations of static, temporal, dynamic, and other information. In one example, the reader system may receive the static information from the asset lookup service. In one example, the temporal, dynamic, and other information may be determinable or known by the reader system, e.g., the geographic location of the tag, the reader subnet prefix, etc. To update the temporal, dynamic, and other asset information in the asset information database of the asset lookup server, the reader system may send (918) asset information to the asset lookup service. For example, the reader system may send the geographic location of the reader, the assigned guest ID, the global routing address of the reader, the site subnet ID of the reader, and/or any measurement information taken or received by the reader, such as local temperature.

The reader system may also send a binding update, which may be compliant with Mobile IP, to allow any message traffic to be directly addressed to the tag 10 through its dynamic tag routing address based on the assigned guest ID. As noted above, the binding update may be sent to the home agent, which may be the asset lookup service, and may be discovered through home agent discovery under Mobile IPv6, or any other suitable process. If the home agent is provided by a system separate from the asset lookup service, the reader system may determine the routing location of the home agent using home agent discovery under Mobile IP or may notify the network of the dynamic tag routing address using any other suitable process or system. It is to be appreciated that the asset information sent and received by the reader system may be provided separately and/or at different times. Additionally, multiple records may be sent individually or in batches.

If the reader system does not receive identification data in response to a sent query to a tag, the reader system may determine (920) if there had been previous contact with a tag 10. More particularly, the reader system may check the reader asset database (FIG. 10) from time to time and/or at each time a query is sent to ensure that identification data has been received for each record associated with a particular identification data. If a record exists (e.g., there was previous contact with a tag 10 and it has not timed out), the reader system may retry contacting the tag (922). Alternatively, the reader system may assume that the tag 10 is no longer within range of the reader service 12 and remove the record associated with that particular identification data 14 from the reader asset database 924. The reader system may also send a binding update (926) compliant with Mobile IP to update the routing of any message traffic addressed to the tag 10. The binding update may include updating the asset information database of the asset lookup server.

Referring to FIG. 14, the reader system 200 may receive message packets addressed to a tag routing address. As noted above with respect to FIG. 5, the reader system may send the packets directly to the tag. Alternatively, as shown in FIG. 14, the reader system may read and analyze (932) the message packet addressed to the tag 10 and determine (934) if the message requires interaction with the tag. For example, if the reader system knows the information requested, e.g., information stored in the reader asset database including the geographic location of the reader, a binding update, or any asset information previously received from either the tag or asset lookup service or available to the reader in some other way, the reader system may respond (946) to the message without sending the message to the tag and without waiting for a response from the tag. If the message information is unknown to the reader or the message requires some interaction by the tag (e.g., turn on sensor), the reader system may send (938) the command or query to the tag. The sent command or query may all or a portion of the received message, depending on the requirements of the interaction and capabilities of the tag. The reader system may receive (940) the tag's response and/or confirmation of receipt.

As noted above, tags generally have a limited command language and may implement a true IP stack supporting a small set of messages. Alternatively, as shown in the illustrated embodiment of FIG. 14, the reader system may optionally perform any necessary transcoding (936) of the received message, such as an instruction set. For example, the transcoding may strip the message of any data not needed by the tag to respond, such as the address and identity of the sender of the message, any security headers, etc. The transcoding may convert at least a portion of the message into a format understandable by the ID tag, such as a private protocol. The transcoding may reduce the bandwidth for the transmission of the message, may reduce the memory used by the tag in storing the message, and/or may allow the tag to receive any message in any format without rewriting the IC of the tag since the reader system may convert the message into an acceptable format. The reader system may then send (938) the command or query portion to the tag. Consequently, the message sent to the tag by the reader system may include a query or message addressed to a particular ID tag in a private protocol. The tag may respond and the reader system may receive (940) the tag's reply. The reader system may then transcode (942), if required, the tag's response into a network compliant public protocol and forward (944) the response to the message originator. Additionally, the reader system may update the reader asset database shown in FIG. 9 with the information received from the tag to decrease the amount of future traffic requiring tag contact.

Figure 15:
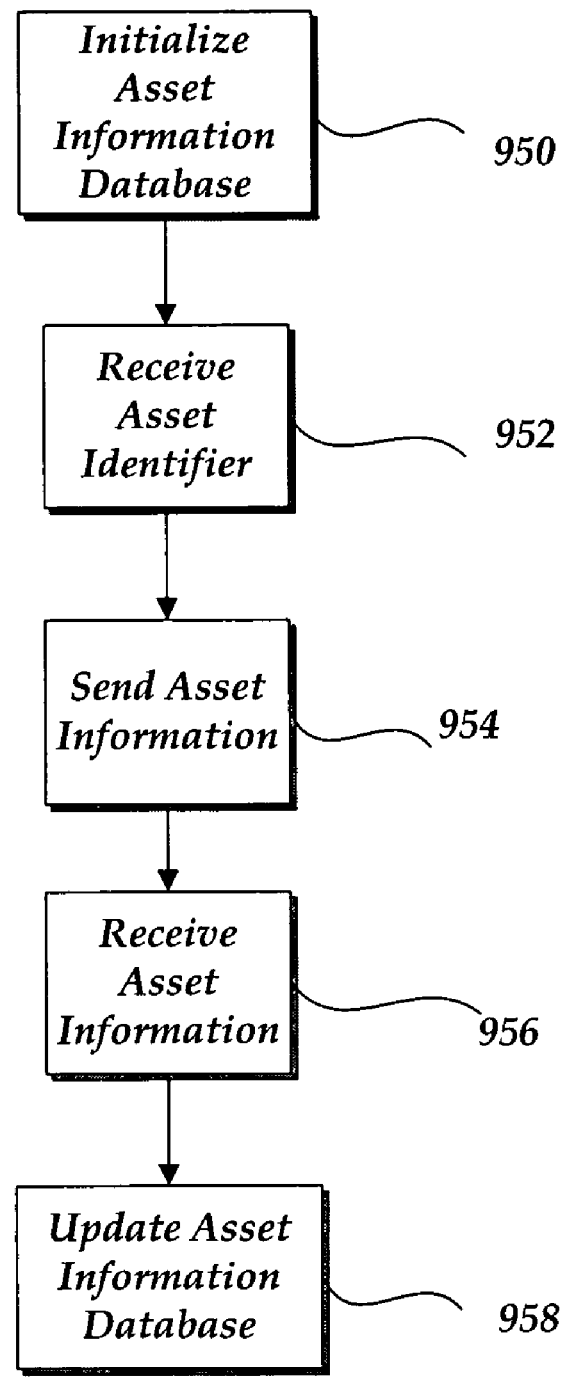
FIG. 15 is a flowchart describing how an asset lookup server is performed in one embodiment.

As shown in FIG. 15, the operations of the asset lookup server 300 providing the asset lookup service 40 include, but are not limited to, initializing 950 the asset information database (FIG. 12) by associating the asset identifier of the tag 10 with specific asset information. Specifically, information about the asset is received from the asset manufacturer or other asset manager. Information about the asset, in an embodiment using the database structure 13 shown in FIG. 6, may include a global routing prefix, an asset identifier which may include an asset type identifier and/or a serial number, model, size, color, asset manufacturer, asset manager, location of the asset, temperature of the asset, manufacturing date, expiration date, and/or asset weight. Any conventional registration or input process or mechanism may be used to obtain this information. The elements of the asset information database may be provided at once or separately and at different times, allowing an asset manager to update the database when information becomes available. Records in the asset information database of FIG. 12 are created or updated using the received information. In particular, the asset lookup server associates an asset identifier with asset information.

Referring to FIG. 15, the asset lookup server 300 operations also include receiving 952 the asset identifier from the reader system along with a query for asset information. The asset lookup server may then match the received asset identifier with a record in the asset information database. The asset lookup server may then send 954 the associated asset information and to the reader system. The asset lookup server operations may also include receiving asset information from the reader system 956. Specifically, the reader system may retrieve more than a global routing prefix and serial number from the identification tag, including static, temporal, dynamic data and/or other information. The asset information database may include records for information determined by the reader system, e.g., the geographic location, the guest ID, and/or other information of the tag, e.g., the reader routing address. If the static, temporal, dynamic, and/or other data needs to be updated or corrected, this information may be received 956 by the asset lookup service to update 958 and maintain the asset information database.

If the asset lookup server is also the home agent, it may perform the operations of a home agent under Mobile IP. These operations may include, but are not limited to, receiving the binding updates, forwarding messages addressed to the tag identification data if compliant with an IP address as shown in FIG. 6, responding to binding updates with the tag's correct dynamic routing address, and performing book-keeping of the dynamic tag routing addresses. It is to be appreciated that the operations of any standard network protocol, including Mobile IPv6, or any suitable operations implementing and maintaining dynamic addressing schemes may be appropriate for the asset lookup server and/or any system acting as a router and/or agent within a mobile network. The various operations discussed above with respect to FIGS. 13–15 need not be performed sequentially or in the order shown.

The computer system with which the various elements of the reader system, the asset lookup server, the resource server, and the tag application of FIGS. 5, 9 and/or 11 may be implemented either individually or in combination and typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

The computing devices illustrated in FIGS. 5, 9, and/or 11 and the tag 10 typically include some form of computer readable media. Computer readable media can be any available media that can be accessed by the other computing devices in the asset management. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing systems in the asset management system. Communication media typically embodies computer readable instructions, data structures, program modules or other data in a modulated data signal such as a carrier wave or other transport mechanism and includes any data in a modulated data signal such as a carrier wave or other transport mechanism and includes any information delivery media. By way of example, and not limitation, communication media includes wired media such as wired network or direct-wired connection, and wireless media such as acoustic, RF, infrared, and other wireless media. Combinations of any of the above should also be included within the scope of computer readable media.

One or more output devices may be connected to the computer system. Example output devices include cathode ray tubes (CRT) display, liquid crystal displays, and other video output devices, printers, communication devices such as a modem, storage devices such as a disk or tape, and audio input. One or more input devices maybe connected to the computer system. Example input devices include a keyboard, keypad, trackball, mouse, pen and tablet, communications devices, and data input devices such as audio and video capture devices. The invention is not limited to the particular input or output devices used in combination with the computer system or to those described herein.

The computer system may be a general purpose computer system which is programmable using a computer programming language, such as SmallTalk, C++, Java, Ada, or C#(C-sharp), or other language, such as a scripting language or even assembly language. Various aspects of the invention may be implemented in a non-programmed environment (e.g., documents created in HTML, XML or other format that when viewed in a window of a browser program, render aspects of a graphical user interface or perform other functions). Various aspects of the invention may be implemented as programmed or non-programmed elements, or any combination thereof. The computer system may also be specially programmed, special purpose hardware, or an application specific integrated circuit (ASIC). The reader system may also include a pager, telephone, personal digital assistant or other electronic data communication device.

In a general purpose communication system, the processor is typically a commercially available processor such as the well-known Pentium® processor available from the Intel Corporation. Many other processors are available. Such a processor usually executes an operating system which may be, for example, the Windows 95®, Windows 98®, Windows NT®, Windows 2000® or Windows XP® available from Microsoft Corporation, MAC OS System X available from Apple Computer, the Solaris Operating System available from Sun Microsystems, or UNIX available from various sources. Many other operating systems may be use.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A computer program product comprising a computer readable medium and computer program instructions stored on the computer readable medium, wherein the computer program instructions, when executed by a reader system, direct the reader system to perform a method for communicating with a radio frequency identification tag, the method comprising:
   (a) sending an identification query to a radio frequency identification tag;
   (b) assigning a guest identification to the radio frequency identification tag, the guest identification forming at least a portion of a tag routing address:
   (c) sending the guest identification and at least a portion of a reader system routing address to a home agent of the radio frequency identification tag;
   (d) receiving a message addressed to the tag routing address of the radio frequency identification tag, the tag routing address being compliant with a standard network protocol; and
   (e) sending a response to the message.

2. The computer program product of claim 1, further comprising sending the message to the radio frequency identification tag.

3. The computer program product of claim 2, further comprising transcoding the message before sending the message to the radio frequency identification tag.

4. The computer program product of claim 2, further comprising receiving a response from the radio frequency identification tag in reply to the message.

5. The computer program product of claim 4, further comprising transcoding the response before sending the response to the message.

6. The computer program product of claim 1, wherein the tag routing address is a care-of-address.

7. The computer program product of claim 1, wherein sending the guest identification includes sending a plurality of guest identifications as a batch to the home agent.

8. The computer program product of claim 1, wherein the guest identification is compliant with an interface identification field of an Internet Protocol address.

9. The computer program product of claim 1, further comprising receiving identification data from the radio frequency identification tag, wherein the identification data includes a first data element comprising a global routing prefix of an Internet Protocol address and a second data element comprising an asset identifier.

10. The computer program product of claim 1, further comprising reading the message addressed to the tag routing address, and performing the instructions contained within the message.

11. A method of asset management comprising:
   (a) sending an identification query to an asset identification tag;
   (b) receiving identification data from the asset identification tag;
   (c) assigning a guest identification to the asset identification tag, the guest identification being compliant with at least a portion of a care-of-address;
   (d) based on the identification data, determining a uniform resource locator for an asset lookup service; and
   (e) based on the determined uniform resource locator, sending at least a portion of the received identification data to the asset lookup service.

12. The method of claim 11, wherein the asset identification tag is a passive radio frequency identification tag.

13. The method of claim 11, wherein the asset identification tag is an active radio frequency identification tag.

14. The method of claim 11, wherein the identification tag is a magnetic strip card.

15. The method of claim 11, wherein the identification tag is an integrated circuit card.

16. A method of asset management comprising:
   (a) sending an identification query to a radio frequency identification tag;
   (b) after sending the identification query, receiving identification data from the radio frequency identification tag;
   (c) assigning a guest identification to the radio frequency identification tag, the guest identification being compliant with at least a portion of a standard network protocol address; and
   (d) concatenating at least a portion of a reader system routing address with the guest identification to form a tag routing address.

17. The method of claim 16, wherein the portion of the reader system routing address includes a global routing prefix and a site subnet identifier.

18. The method of claim 16, wherein the tag routing address is compliant with a Mobile Internet Protocol.

19. The method of claim 16, further comprising sending the tag routing address to a home agent of the radio frequency identification tag.

20. The method of claim 19, wherein sending the tag routing address includes sending a plurality of tag routing address for a plurality of tags as a batch.

21. The method of claim 16, wherein the identification data includes a first data element comprising a global routing prefix of an Internet Protocol address and a second data element comprising an asset identifier.

22. The method of claim 16, further comprising receiving a message addressed to a tag routing address.

23. The method of claim 22, further comprising sending the message to the radio frequency identification tag.

24. The method of claim 23, further comprising transcoding the message before sending the message to the radio frequency identification tag.

25. The method of claim 22, further comprising reading the message addressed to the tag routing address, and performing the instructions contained within the message.

26. The method of claim 22, further comprising receiving a response from the radio frequency identification tag in reply to the message.

27. An identification tag reader suitable for use with an identification tag, wherein the identification tag is selected from a group consisting of a passive identification tag and an active identification tag consisting essentially of an integrated chip, a battery and an antenna, the identification tag reader having computer executable instructions for performing steps comprising:
   (a) receiving identification data from the identification tag;
   (b) concatenating at least a portion of a routing address of the identification tag reader with guest identification to form the tag routing address:
   (c) receiving a message addressed to a tag routing address of the identification tag, the tag routing address being compliant with a standard network protocol; and
   (d) sending a response to the message.

28. The identification tag reader of claim 27, wherein the identification tag is a passive identification tag.

29. The identification tag reader of claim 27, wherein the identification tag is an active identification tag consisting essentially of an integrated chip, a battery and an antenna.

30. The identification tag reader of claim 27, wherein the identification tag is a radio frequency identification tag.

31. The identification tag reader of claim 27, further comprising sending the message to the identification tag.

32. The identification tag reader of claim 27, further comprising assigning a guest identification to the identification tag, the guest identification forming at least a portion of the tag routing address.

33. The identification tag reader of claim 32, further comprising sending the guest identification to a home agent of the identification tag.

34. The identification tag reader of claim 27, further comprising reading the message addressed to the tag routing address, and performing the instructions contained within the message.

35. The identification tag reader of claim 27, wherein the portion of the routing address of the identification tag reader includes a global routing prefix and a site subnet identifier.

36. The identification tag reader of claim 27, wherein the tag routing address is compliant with a Mobile Internet Protocol.

* * * * *